(12) United States Patent
Magri et al.

(10) Patent No.: US 11,767,179 B2
(45) Date of Patent: Sep. 26, 2023

(54) MANIPULATION HEAD FOR OBJECTS

(71) Applicant: A.C.M.I.—SOCIETA' PER AZIONI, Fornovo di Taro (IT)

(72) Inventors: Giacomo Magri, Beduzzo (IT); Giorgio Oppici, Rubbiano di Solignano (IT)

(73) Assignee: A.C.M.I.—SOCIETA' PER AZIONI, Fornovo di Taro (IT)

( * ) Notice: Subject to any disclaimer, the term of this patent is extended or adjusted under 35 U.S.C. 154(b) by 190 days.

(21) Appl. No.: 17/230,205

(22) Filed: Apr. 14, 2021

(65) Prior Publication Data
US 2021/0323777 A1    Oct. 21, 2021

(30) Foreign Application Priority Data
Apr. 16, 2020  (IT) .................. 102020000008080

(51) Int. Cl.
*B65G 47/90*    (2006.01)
*B25J 9/00*    (2006.01)
*B25J 15/00*    (2006.01)

(52) U.S. Cl.
CPC .......... *B65G 47/907* (2013.01); *B25J 9/0093* (2013.01); *B25J 15/0052* (2013.01); *B65G 2201/0244* (2013.01)

(58) Field of Classification Search
CPC ... B25J 9/0093; B25J 15/0052; B65G 47/907; B65G 2201/0244
See application file for complete search history.

(56) References Cited

U.S. PATENT DOCUMENTS

| 4,199,050 | A | * | 4/1980 | Moller | .................. B65B 61/28 53/247 |
| 5,093,978 | A | * | 3/1992 | Binder | ................ B23Q 3/1554 901/29 |
| 9,120,625 | B2 | * | 9/2015 | Begin | ................. B65G 47/082 |
| 2019/0077609 | A1 | | 3/2019 | Knobloch | |
| 2021/0053771 | A1 | * | 2/2021 | Ryland | ................. H01M 10/14 |

FOREIGN PATENT DOCUMENTS

| DE | 202010001712 U1 | 6/2011 |
| DE | 202016101207 U1 | 6/2017 |
| EP | 3587284 A1 | 1/2020 |
| EP | 3604182 A1 | 2/2020 |
| FR | 2971497 A1 | 8/2012 |
| IT | MO20070157 A1 | 11/2008 |

* cited by examiner

*Primary Examiner* — Saul Rodriguez
*Assistant Examiner* — Brendan P Tighe
(74) *Attorney, Agent, or Firm* — Browdy and Neimark, PLLC (57) ABSTRACT

A seizing head for objects is described that includes a support frame adapted to be coupled to a manipulator robot, and a plurality of picking apparatuses arranged mutually flanked according to a predefined flanking direction and individually adapted to take and withhold at least one object, wherein each picking apparatus is installed on a respective mobile frame, which is slidably coupled to the support frame according to a sliding direction parallel to the flanking direction, and wherein the seizing head further includes a plurality of functionally independent activation devices, each of which is adapted to activate a respective mobile frame along said sliding direction.

8 Claims, 7 Drawing Sheets

MANIPULATION HEAD FOR OBJECTS

TECHNICAL FIELD

The present invention relates to a seizing head for objects, e.g. for bottles, cans or other containers, which is intended to be connected to a manipulation robot, e.g. in the area of a packaging and/or packing plant for the aforesaid objects.

BACKGROUND

As is known, some types of objects, e.g. bottles or cans, are sold in bundles, i.e. in smaller or larger groups of objects packaged together.

Sometimes the objects that form the bundle, although being structurally identical, e.g. all bottles or all cans, may be of different types, e.g. they may contain different products.

To form this type of bundle, the objects are normally loaded onto a series of conveyor belts, also known as channel belts, each of which is adapted to only transport objects of the same type.

By advancing in a row on these channel belts, the objects are brought into an operating area in which there is a manipulation robot that picks a certain number of objects from each channel belt and rearranges them on a collection plane, grouping them with the objects picked from the other channel belts to form a group that will constitute the bundle.

The collection plane can be defined for example by a further conveyor belt that makes the groups of objects thus obtained advance towards a stabilization station, e.g. for wrapping with extensible film, banding, wrapping in paper or the like, to obtain the bundle.

Returning to the manipulation robot, the latter can form the group by picking the objects from one channel belt at a time and arranging them gradually on the collection plane in an orderly way, flanking them with the ones already picked from the other channel belts.

This operating method guarantees great flexibility in the formation of groups but has the drawback of being operatively slow, significantly reducing the productivity of the entire packaging and/or packing plant.

Another method for forming the group is that of equipping the manipulation robot with a seizing head adapted to pick the objects from a plurality of channel belts at the same time and transport them all together on the collection plane.

This solution is certainly quicker from an operating point of view but also much more rigid in relation to the formation of the group, which will always be composed of the same number of objects coming from each channel belt, unless production is stopped to reconfigure or replace the manipulation head.

DISCLOSURE OF THE INVENTION

In light of the above, an object of the present invention is to solve, or at least mitigate, the mentioned drawbacks of the prior art, within the context of a simple and rational solution and at a relatively contained cost.

This and other objects are reached thanks to the characteristics of the invention as set forth in the independent claim 1. The dependent claims outline preferred and/or particularly advantageous aspects of the invention but not strictly necessary for its attainment.

In particular, an embodiment of the invention provides a seizing head for objects comprising:

a support frame adapted to be coupled to a manipulation robot, and a plurality of picking apparatuses arranged mutually flanked according to a predetermined flanking direction and individually adapted to take and withhold at least one object, wherein each picking apparatus is installed on a respective mobile frame, which is slidably coupled to the support frame according to a sliding direction parallel to the flanking direction, and wherein the seizing head comprises a plurality of functionally independent activation devices, each of which is adapted to activate a respective mobile frame along said sliding direction.

Thanks to this solution, the seizing head can simultaneously pick up from each channel belt a certain number of objects, to then group them together, e.g. during the transfer step towards the collection plane, by means of the activation of mobile frames that carry the picking apparatuses.

In this way, it is advantageously possible to accelerate the forming process of the groups that will constitute the bundles, therefore increasing the productivity of the entire packaging and/or packing plant.

On the other hand, since the activation of mobile frames is independent, the seizing head can be easily reconfigured, e.g. through a simple reprogramming of the control software, so as to split the objects picked by the channel belts into groups of different composition, e.g. containing a different number of types of objects and/or a different number of objects of each type.

For example, by appropriately modifying the relative position of the mobile frames along the sliding direction, it is advantageously possible to use each pair of mutually adjacent picking apparatuses, not only for picking objects from two consecutive channel belts, but also possibly for picking objects from two non-consecutive channel belts, e.g. by skipping one or more of the intermediate channel belts, thus modifying the composition of the group.

Furthermore, still through an appropriate regulation of the distance between the picking apparatuses along the sliding direction, the seizing head can be easily reconfigured to treat objects of different formats, without requiring any structural modifications.

In this way, the operation of the seizing head is advantageously very flexible and easily adaptable to any production changes, without requiring long stopping times.

According to an aspect of the invention, each picking apparatus can be configured to retain a plurality of objects arranged in a row, preferably in a single row, along an alignment direction perpendicular to the sliding direction of the mobile frames.

In this way, the seizing head is effectively able to pick an entire row of objects from each channel belt, to then appropriately move it towards/away from the rows of objects that are simultaneously picked from the other channel belts.

By way of example, each picking apparatus can comprise at least one gripping member and corresponding actuator members for opening and closing each gripping member.

These mechanical picking apparatuses are effectively able to physically grasp the objects to be transported which, in the exemplified case of bottles, can be retained by the neck.

However, it is not excluded that, in other embodiments and/or for different types of objects, the picking apparatuses of the seizing head may be different, e.g. of the pneumatic or suction pad type or any other type suitable for the purpose.

According to another aspect of the invention, each activation device of the seizing head can comprise a motor installed on the respective mobile frame and adapted to place in rotation a pinion arranged meshing on a rack fixed to the support frame.

In this way, it is advantageously possible to limit the dimensions of the activation devices, while allowing the independent and effective movement of all the mobile frames.

In this context it is for example possible that two or more pinions of the same number of activation devices can be meshed to the same rack.

However, it is not excluded that, in other embodiments, the activation devices may be made differently, e.g. through belt systems, linear motors or of any other type, still enabling the independent movement of the mobile frames.

According to a different aspect of the invention, the support frame can have a planar conformation and the sliding direction of the mobile frames can be parallel to the plane defined by the support frame.

This aspect has the advantage of making available a seizing head having relatively contained dimensions.

Still from this point of view, the seizing head can further comprise a connection member to the manipulation robot fixed to the opposite side of the support frame with respect to the picking apparatuses.

Said connection member can comprise, for example, a cylindrical body, possibly flanged, having an orthogonal axis with respect to the sliding direction of the mobile frames.

Another embodiment of the present invention makes available a plant for the formation of groups of objects comprising:
- a plurality of channel belts individually adapted to make a row of objects advance,
- a collection plane, and
- a manipulation robot provided with the seizing head outlined above, to transfer objects from the channel belts to the collection plane.

By exploiting the benefits of the seizing head, this plant has the advantage of allowing the creation of a wide range of different groups of objects, flexibly and with high productivity.

BRIEF DESCRIPTION OF THE FIGURES

Further features and advantages of the invention will be more apparent after reading the following description provided by way of non-limiting example, with the aid of the figures shown in the accompanying drawings.

DETAILED DESCRIPTION

From the mentioned figures a plant 100 is noted for grouping objects P, i.e. for forming groups F of objects P mutually adjacent and neared, which are intended to be stabilized together, obtaining a bundle, so as to be able to be subsequently stored, transported and possibly sold as a single item.

The objects P may be for example bottles, cans or any other container adapted to contain a product, preferably but not necessarily of the food sector (e.g. beverages).

Within the groups F to be created, the objects P may be arranged coplanar, substantially forming a layer, and they can be ordered in parallel and mutually adjacent rows.

The objects P of each row may be identical to one another but differ from the objects P that form one or more of the other rows of the same group F, e.g. in relation to the content thereof.

This type of groups F can be obtained with a re-packaging process through which the objects of different types, e.g. contained in a different product, are first unloaded from respective pallets (e.g. manually) and then grouped again into smaller groups F and individually formed by two or more types of objects P.

The plant 100 can be advantageously used within the area of this and/or other similar packaging/repackaging processes.

For this purpose, the plant 100 can comprise a plurality of conveyor belts 105, called channel belts, each of which is adapted to make a set of objects P advance together, arranged in a row, preferably a single row.

The objects P arranged on each channel belt 105 may all be of the same type, e.g. they can all contain exactly the same product (e.g. the same beverage).

The assembly of channel belts 105 overall can however transport two or more types of different objects P, e.g. containing a different product (e.g. a different beverage or of a different flavour), to each of which a single channel belt 105 or various channel belts 105 can be assigned according to requirements.

The objects P can be loaded at one end of each channel belt 105, so as to be transported towards an operating station 110 in which the groups F are formed.

As previously mentioned, the objects P can be loaded onto the channel belts 105 manually.

Figure 2:
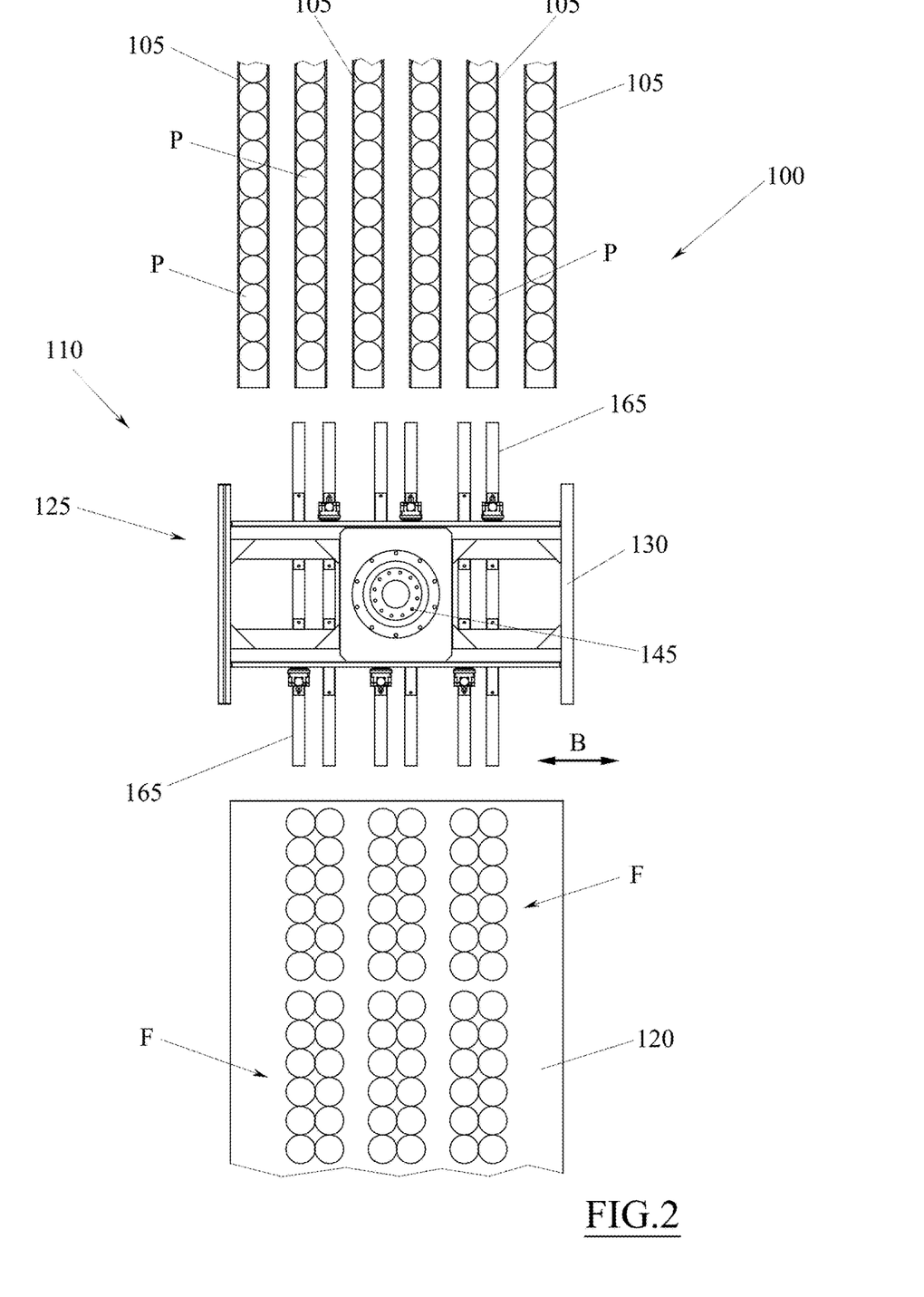
FIG. 2 is a view from above of the plant of FIG. 1 wherein the manipulation robot has been omitted and wherein the seizing head is shown in a first operating mode.
Figure 3:
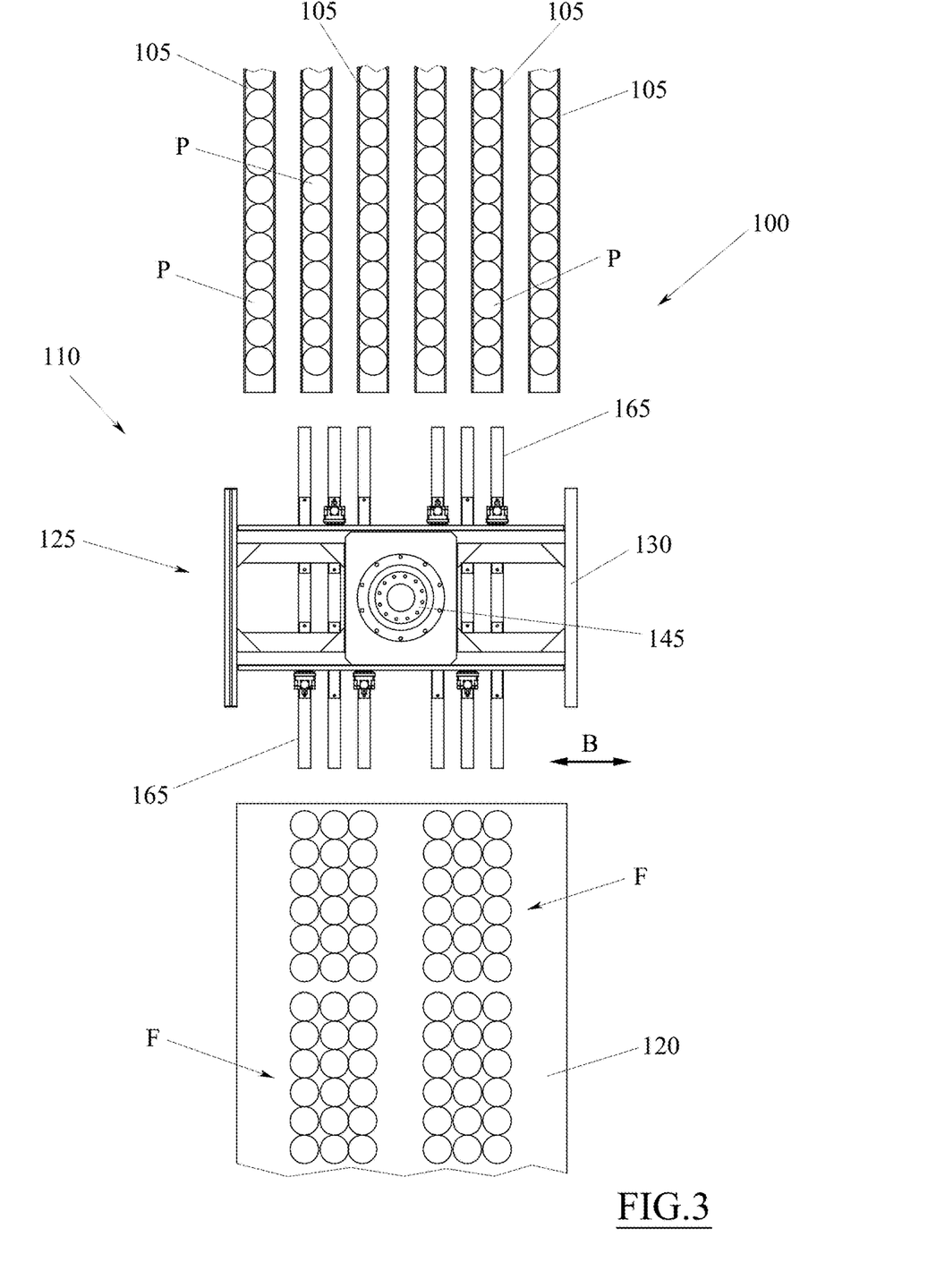
FIG. 3 is the view of FIG. 2 in which the seizing head is shown in a second operating mode.

At the operating station 110, the channel belts 105 may be arranged so as to advance in the rectilinear and horizontal direction, parallel and coplanar to one another, e.g. mutually equidistant (see FIGS. 2 and 3).

Figure 1:
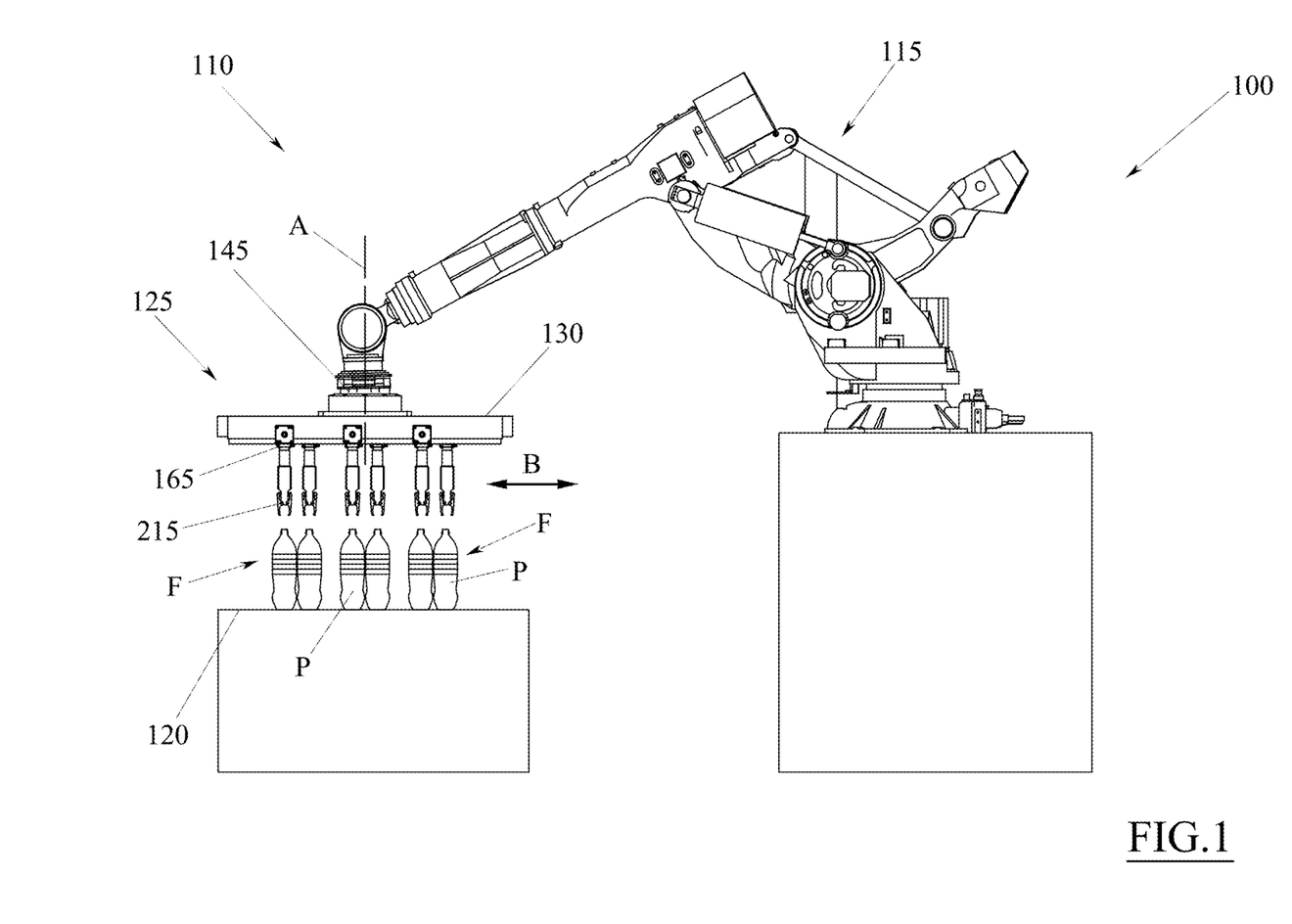
FIG. 1 is a front schematic view of a plant for grouping objects.

Still at the operating station 110, the plant 100 can comprise a manipulation robot 115 (see FIG. 1), which is adapted to pick the objects P from the channel belts 105 and transfer them onto a collection plane 120 of the groups F.

The collection plane 120 can be made available by a further conveyor belt, having for example larger dimensions with respect to the channel belts 105, which can be made to advance the groups F towards a stabilization station (not illustrated).

In the stabilization station, the objects P of each group F are grouped together, e.g. through winding with an extensible film, banding, or boxing, so as to form a pack/bundle that can be treated and handled as a single object.

To transfer the objects P from the channel belts 105 to the collection plane 120, the manipulation robot 115 can be equipped with a relevant seizing head 125. Thanks to the coupling with the manipulation robot 115 the seizing head 125 can be provided with multiple degrees of freedom, also including a degree of rotation freedom onto itself about a predefined axis of rotation A, oriented for example vertically.

In the example illustrated, the manipulation robot 115 is an anthropomorphous robot and the seizing head 125 can be fixed to the terminal wrist of said anthropomorphous robot.

In other embodiments, the manipulation robot 115 could however be any other type of robot, e.g. a Cartesian robot, as long as it is adapted to move the seizing head 125.

The seizing head 125 can comprise a support frame 130 preferably of the rigid type.

This support frame 130 can have a substantially planar conformation, i.e. extending in two prevalent dimensions (e.g. length and width), mutually orthogonal and defining a plane, and in a minority dimension (e.g. thickness) orthogonal to the previous ones and having a smaller extension with respect thereto.

With respect to the plane defined by its prevalent dimensions, the support frame 130 can have a substantially polygonal shape.

In the example shown (see FIG. 4), the shape of the support frame 130 is substantially rectangular and is defined by a pair of longitudinal bars 135 mutually parallel and opposed, which are fixed to the same number of cross bars 140 also mutually parallel and opposed but orthogonal to the longitudinal bars 135.

Possibly, the support frame 130 can be reinforced through corner pieces, plates and/or other reinforcement elements that may for example be welded to the aforesaid longitudinal bars 135 and cross bars 140.

Obviously, the embodiment of the support frame 130 may also be different, as long as it preferably maintains a substantially planar conformation.

In this way, the support frame 130 can be coupled to the manipulation robot 115 so that the plane defined thereby is substantially horizontal and/or orthogonal to the axis of rotation A and can therefore make available an upper side and an opposite lower side.

At the upper side, the support frame 130 can be provided with a connection member 145 to the manipulation robot 115.

This connection member 145 can be fixed to the centre of the support frame 130, for example through a fixing plate constrained to the upper side of the cross bars 140.

In particular, the connection member 145 can comprise a cylindrical body 155, preferably flanged and internally hollow, the central axis of which is oriented vertically and/or can coincide with the axis of rotation A.

An anti-collision safety device 160 can be interposed between this cylindrical body 155 and the plate.

The seizing head 125 further comprises a plurality of mobile frames 165, which are coupled to the support frame 130, preferably on the opposite side with respect to the connection member 145, in the case in question at the lower side.

Each mobile frame 165 is slidably coupled to the support frame 130 so that all such mobile frames 165 can move along the same predefined rectilinear sliding direction B.

Preferably, the sliding direction B is parallel to the plane defined by the support frame 130, e.g. parallel to the cross bars 140, and/or orthogonal to the axis of rotation A, so as to be able to be substantially horizontal.

Figure 4:
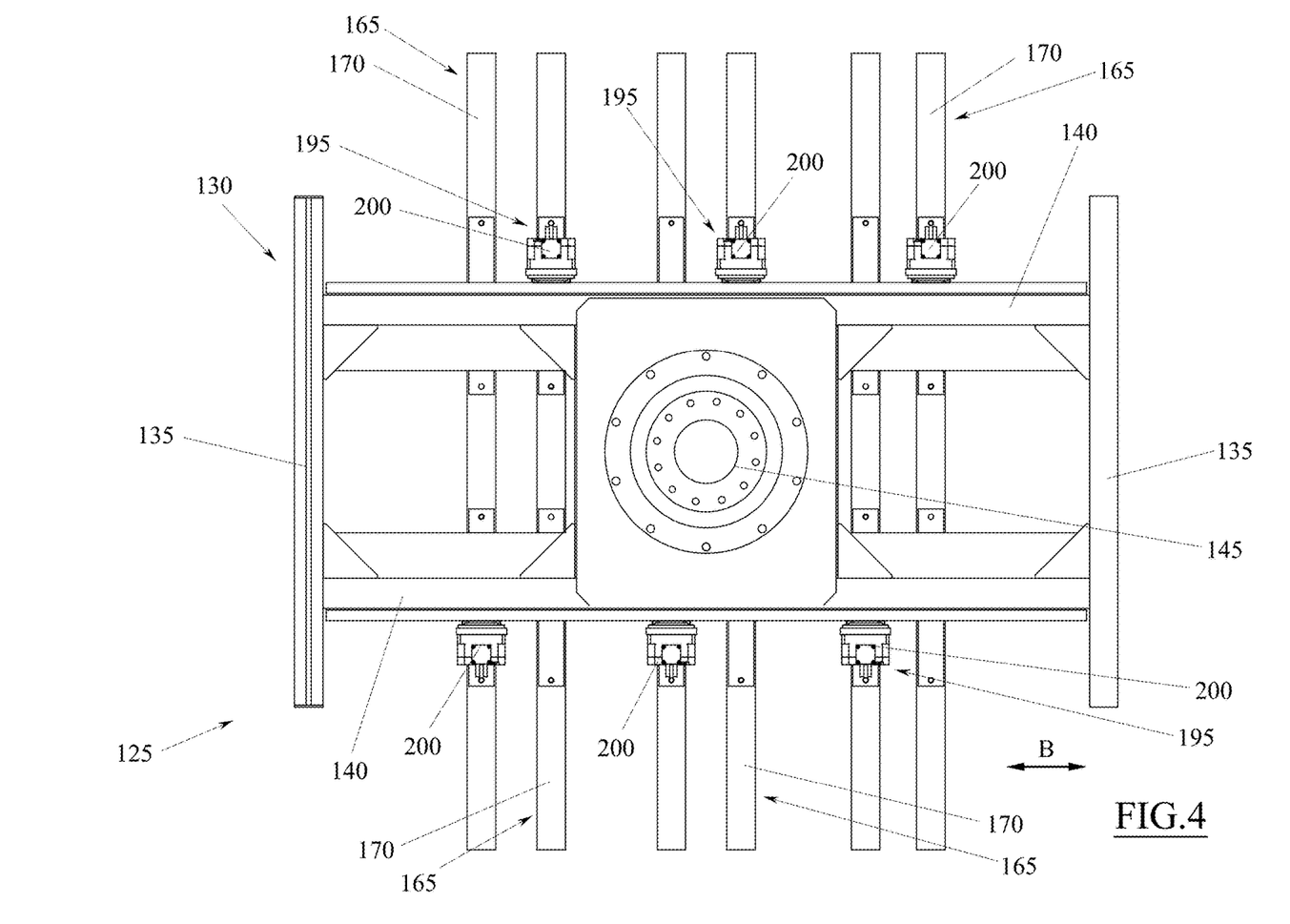
FIG. 4 is a view from above of the seizing head shown in an enlarged scale.
Figure 5:
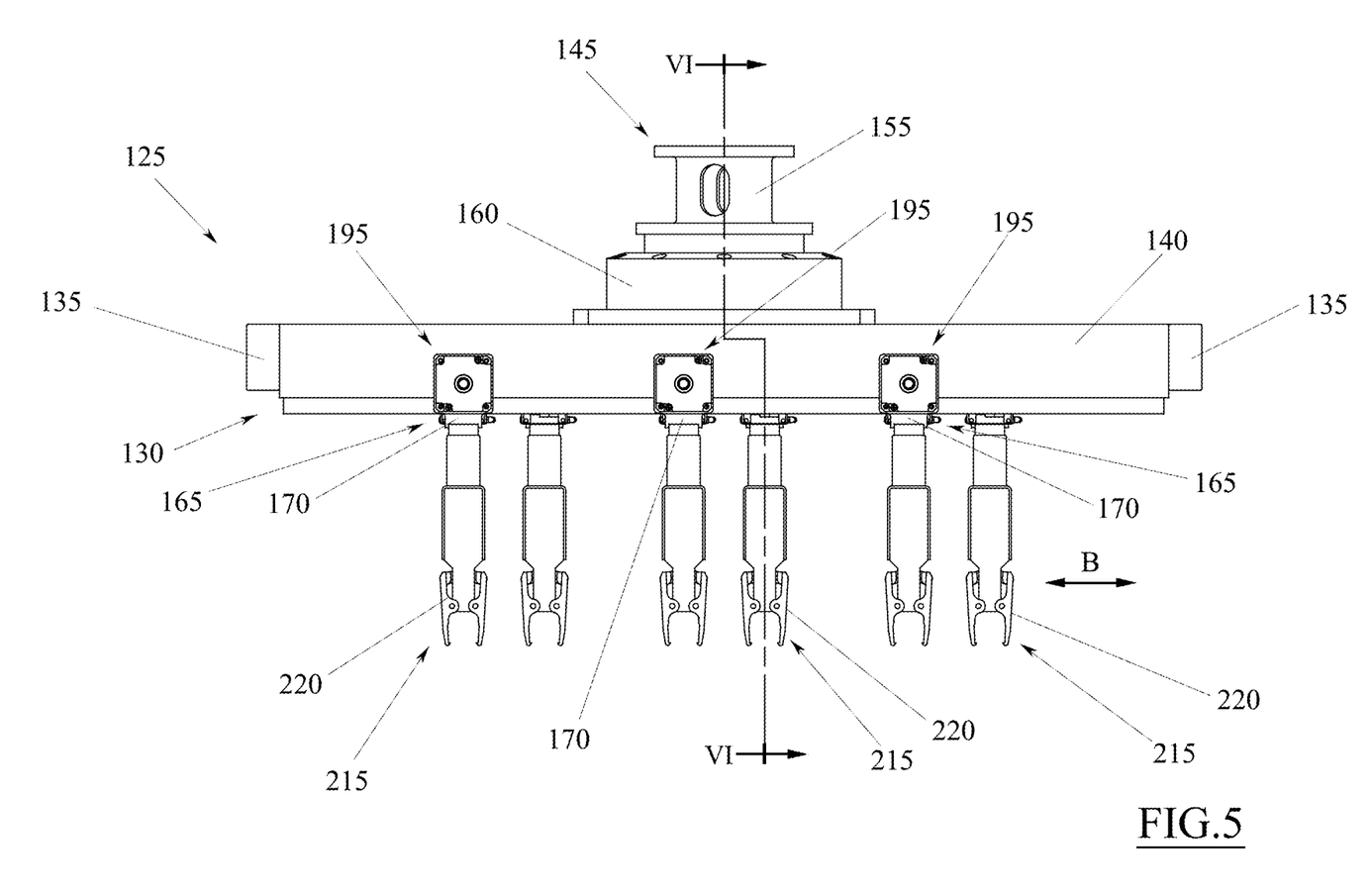
FIG. 5 is a front view of the seizing head of FIG. 4.

In particular, each mobile frame 165 may comprise a rectilinear bar 170, which extends parallel to the plane defined by the support frame 130 and orthogonally with respect to the sliding direction B (see FIG. 4).

The rectilinear bars 170 of the mobile frames 165 can all be the same and/or can have a larger longitudinal extension with respect to the distance that separates the cross bars 140 of the support frame 130, so as to project from both sides of the latter.

The rectilinear bars 170 of the mobile frames 165 are preferably coplanar in a(n) (ideal) plane parallel to the plane defined by the support frame 130 and are mutually flanked along the sliding direction B.

The number of mobile frames 165 can vary according to the applications, for example but not necessarily from a minimum of six to a maximum of twelve, obviously as long as these mobile frames 165 are not mutually locked in a pack but can at least partially move with respect to the support frame 130 along the sliding direction B.

In general, the number of mobile frames 165 may be the same as the number of channel belts 105.

Figure 6:
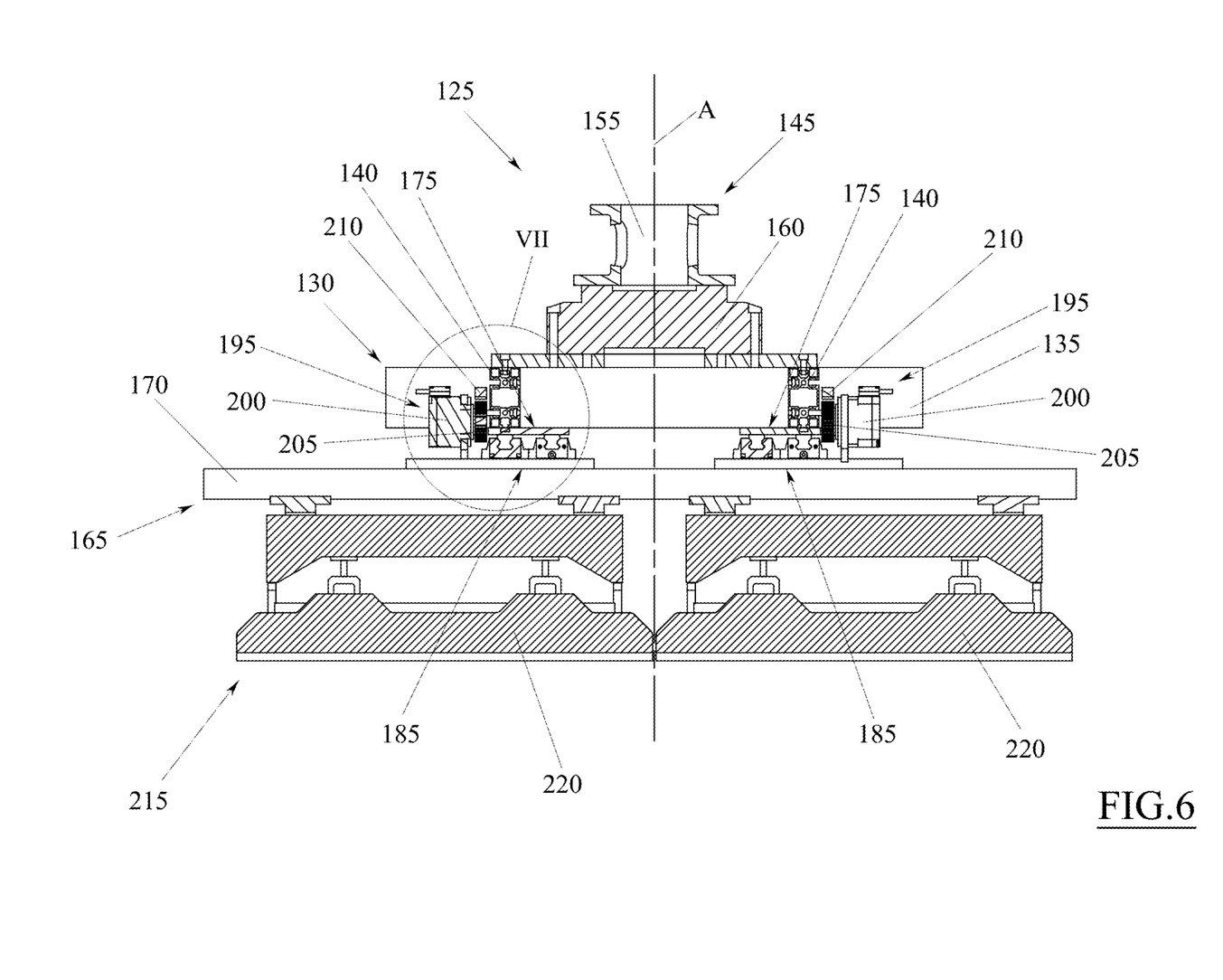
FIG. 6 is the section VI-VI of FIG. 5.
Figure 7:
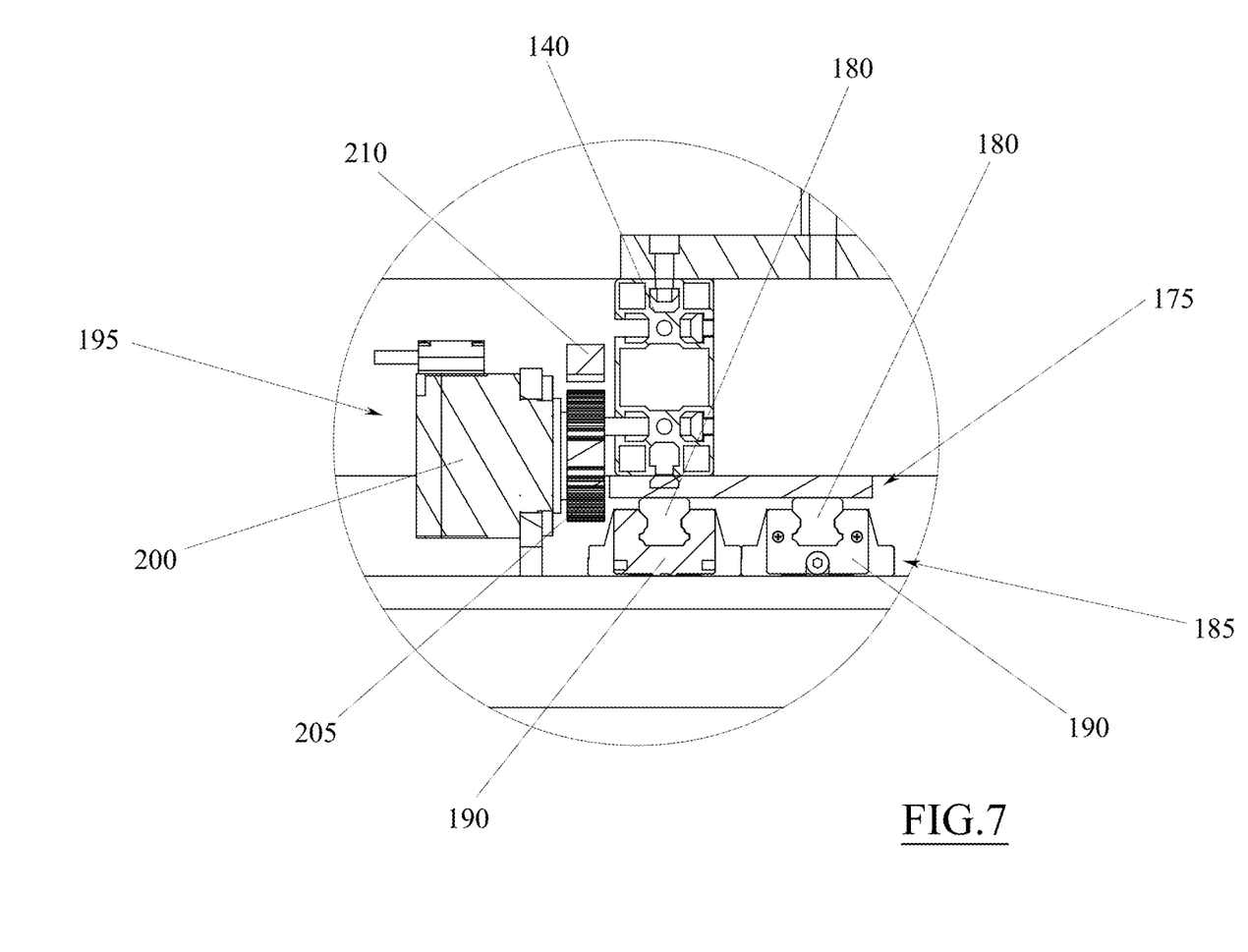
FIG. 7 is the detail VII of FIG. 6 shown in an enlarged scale.

As illustrated in FIGS. 6 and 7, to enable the sliding of such mobile frames 165, the support frame 130 can comprise two guide members 175, which can be fixed to the lower side thereof.

For example, each guide member 175 can be fixed at a respective cross bar 140. In particular, each guide member 175 can comprise one or more rails 180 (see FIG. 6), possibly projecting in a cantilever fashion from a fixing plate joined to the support frame 130 each of which extends in a rectilinear way parallel to the sliding direction B.

Correspondingly, each mobile frame 165 can comprise a pair of sliders 185, each of which is slidably coupled to a respective guide member 175.

For example, each slider 185 can comprise a skid 190 appropriately fixed to the rectilinear bar 170, possibly with the interposition of a fixing plate (see FIG. 6).

Each of these skids 190 can comprise a longitudinal through cavity that is inserted slidably onto a respective rail 180 and that, preferably, creates therewith a shape constraint (e.g. dovetail) which prevents these two components from separating in the transverse sense with respect to the sliding direction B.

In this way, the coupling between the guide members 175 and the sliders 185 also enables each mobile frame 165 to be kept hanging below the support frame 130.

Naturally, the same effect could also be obtained by inverting the rails 180 and the skids 190, i.e. equipping the guide members 175 with longitudinal cavities and providing the sliders 185 with corresponding projecting bodies adapted to be inserted slidably into said longitudinal cavities.

It is also to be observed that, in other embodiments, the support frame 130 could comprise a different number of guide members 175 from the one illustrated above, e.g. only one or more than two, and that each mobile frame 165 could therefore comprise a corresponding different number of sliders 185.

What remains preferable is however the fact that to each guide member 175 of the support frame 130 at least one slider 185 of two or more mobile frames 165 is slidably coupled, so as to reduce the dimensions and complexity of the seizing head 125.

The seizing head 125 further comprises a plurality of functionally independent activation devices 195, each of which is adapted to activate a respective mobile frame 165 along the sliding direction B, independently and autonomously with respect to the others.

In the example illustrated, each of these activation devices 195 comprises a motor 200 (or gear motor), e.g. an electric motor, which is fixed onto the corresponding mobile frame 165, so as to be constrained to move integrally therewith.

The motor 200 places in rotation a respective pinion 205, which is arranged meshing with a rack 210 firmly fixed to the support frame 130, e.g. to one of the cross bars 140, and which extends parallel to the sliding direction B.

In this way, by activating the motor 200, the pinion 205 rolls on the rack 210, causing the contextual sliding of the corresponding mobile frame 165 in one direction or the other, according to the rotation direction imparted by the motor 200 on the pinion 205.

As illustrated in FIG. 4, each mobile frame 165 is preferably provided with only one motor 200 and the assembly of motors 200 of all the mobile frames 165 are preferably positioned alternately on opposite sides with respect to the support frame 130.

In practice, the seizing head 125 can be provided with two racks 210, which may be arranged on opposite sides of the support frame 130, e.g. individually fixed to a respective cross bar 140, of which a first rack 210 cooperates with the motors 200 of a first group of mobile frames 165, while the second rack 210 cooperates with the motors 200 of a second group of mobile frames 165, and wherein the mobile frames 165 of the second group alternate with the mobile frames 165 of the first group along the sliding direction B.

This prevents the motor 200 of a mobile frame 165 being able to create a dimension such as to interfere with the motors 200 of the adjacent mobile frames 165, limiting the mutual nearing freedom.

Despite this, it is preferable for each rack 210 to cooperate with the motors 200 of a plurality of mobile frames 165, so as to reduce the costs and complexity of the seizing head 125.

However, the possibility of the activation devices 195 being able to be realized completely differently from what is described above is not excluded, for example through belt systems, linear motors or any other type, as long as they guarantee the possibility to move each mobile frame 165 independently and autonomously from all the others, for example as long as each activation device comprises its own motor (or gear motor) adapted to activate the corresponding mobile frame 165.

In any case, the control of the operation of the activation devices 195 can always be assigned to an electronic control unit (not illustrated), which can be programmed and possibly reprogrammed, so as to move and reposition the mobile frames 165 along the sliding direction B, as will become clear below.

Finally, the seizing head 125 comprises a plurality of picking apparatuses 215, each of which is carried by a respective mobile frame 165, e.g. on the opposite side with respect to the support frame 130.

In this way, also the picking apparatuses 215 are individually movable with respect to the support frame 130 along the sliding direction B, and mutually flanked according to a parallel flanking direction to said sliding direction B.

Each of these picking apparatuses 215 is adapted to pick, retain and release at least one object P at a time.

More preferably, each picking apparatus 215 is however configured/structured to pick, retain and release, for example simultaneously, a plurality of objects P arranged in a row, preferably in a single row, along an alignment direction perpendicular to the sliding direction B.

In the example illustrated, each picking apparatus 215 comprises at least one gripping member 220 and corresponding actuator members (not illustrated) for opening and closing said gripping member 220.

The gripping member 220 can comprise, for example, a pair of jaws, parallel and mutually opposed, which are mutually movable, e.g. oscillating about respective articulation axes, so as to pass from a closed configuration, in which they are near to one another, to an open configuration in which they are more spaced out. When they are in the open configuration, a gap remains between the jaws in which a portion of the objects P to be transported can be housed which, in the case of bottles, may be the neck.

Passing to the closed configuration, the jaws clamp onto such portion, retaining the objects P.

These jaws can extend along the longitudinal direction of the rectilinear bar 170 of the respective mobile frame 165, for a sufficient stretch to act on the entire row of objects P to be transported.

In the example illustrated, each picking apparatus 215 however comprises at least two gripping members 220 arranged aligned with one another along the longitudinal direction of the rectilinear bar 170 of the respective mobile frame 165 (see FIG. 6).

Although the gripping members 220 have been illustrated, it is hereby specified that other embodiments could use completely different picking apparatuses 215, which could be of the mechanical or another type, e.g. of the pneumatic, magnetic, suction pad type or the like, and may be selected keeping in consideration the shape and/or other specific characteristics of the objects P to be transported.

In light of the above, the operation of the seizing head 125 can be outlined as follows.

In a first step, the mobile frames 165 can be positioned so that the mutual distance between the picking apparatuses 215, along the sliding direction B, corresponds to the distance between the channel belts 105 at the operating station 110.

For example, the mobile frames 165 can be positioned equidistant and separated by the same pitch as the pitch that separates the channel belts 105 in said operating station 110.

With the mobile frames 165 in this configuration, the manipulation robot 115 can lower the seizing head 125 onto the channel belts 105, so that each picking apparatus 215 can pick up and retain a respective row of objects P.

At this point, the manipulation robot 115 can lift the seizing head 125 and transport it, together with the picked objects P, towards the collection plane 120 (see FIG. 2).

During this transport step, the mobile frames 165 can be made to slide with respect to the support frame 130 along the sliding direction B, so as to move some predefined rows of objects P towards one another, forming two or more groups F of objects P.

In the example, in the event that the seizing head 125 has six mobile frames 165, it can pick six rows of objects P from the same number of channel belts 105, which can be moved towards each other two by two, forming three groups F individually composed of two rows of objects P (see FIG. 2), or may be moved towards one another three by three, forming two groups F individually composed of three rows (see FIG. 3), or in any other possible combination.

After performing these groupings, the manipulation robot 115 can lower the seizing head 125 onto the collection plane 120 and the picking apparatuses 215 can be simply controlled to release the groups F thus formed thereon.

It follows that, based on the type of objects P arranged on each channel belt 105, it is advantageously possible to create a multiplicity of groups F, each of which can be formed for example by rows of objects P of different types, the number and position of which varies based on the groupings performed.

Obviously, the larger the number of mobile frames 165 provided at the seizing head 125, the more combination possibilities there are.

However, it is highlighted that, thanks to the possibility to make each mobile frame 165 slide independently from all the others, the seizing head 125 can be reconfigured so as to pass from one combination to the other extremely simply and quickly, e.g. through appropriate programming or re-programming of the electronic control unit that controls the operation thereof.

Furthermore, by appropriately modifying the relative position of the mobile frames 165 along the sliding direction B (centre distance), it is advantageously possible to use each pair of picking apparatuses 215 immediately adjacent to one another, not only to pick objects P from two consecutive channel belts 105 (as schematically represented in the figures), but also for picking objects from two nonconsecutive channel belts 105, e.g. skipping one or more intermediate channel belts 105, thus further increasing the composition freedom of the groups F.

This can happen by leaving one or more picking apparatuses 215 unloaded, or by using them all in any case, even if the number of channel belts 105 is greater. Still through appropriate regulation of the distance between the picking apparatuses 215 along the sliding direction B, the seizing head 125 can further be easily reconfigured to treat objects P of different formats, and therefore that are at different distances on the channel belts 105, without requiring any structural modifications.

Obviously, an expert in the field may make several technical-applicative modifications to the above description, without departing from the scope of the invention as hereinbelow claimed.

The invention claimed is:

1. A seizing head for objects comprising:
   a support frame adapted to be coupled to a manipulation robot, and
   a plurality of picking apparatuses arranged mutually flanked according to a predetermined flanking direction and individually adapted to pick up and withhold at least one object,
   wherein each picking apparatus is installed on a respective mobile frame, which is slidably coupled to the support frame according to a sliding direction parallel to the flanking direction, and
   wherein the seizing head further comprises a plurality of functionally independent activation devices, each of which is adapted to activate a respective mobile frame along said sliding direction,
   wherein each activation device comprises a motor installed on the respective mobile frame and adapted to place in rotation a pinion arranged meshing on a rack fixed to the support frame.

2. A seizing head according to claim 1, wherein each picking apparatus is configured to retain a plurality of objects arranged in a row along an alignment direction perpendicular to the sliding direction of the mobile frames.

3. A seizing head according to claim 1, wherein each picking apparatus comprises at least one gripping member and corresponding actuator members for opening and closing said gripping member.

4. A seizing head according to claim 1, wherein the support frame has a planar conformation and the sliding direction of the mobile frames is parallel to the plane defined by the support frame.

5. A seizing head according to claim 1, comprising a connection member to the manipulation robot fixed on the opposite side of the support frame with respect to the picking apparatuses.

6. A seizing head according to claim 5, wherein said connection member comprises a cylindrical body having an axis orthogonal with respect to the sliding direction of the mobile frames.

7. A system for the formation of groups of objects comprising:
   a plurality of channel belts individually adapted to make a row of objects advance,
   a collection plane, and
   a manipulation robot provided with the seizing head of claim 1, for transferring objects from the channel belts to the collection plane.

8. The seizing head according to claim 1, wherein the pinions of two or more activation devices are meshed to the same rack.

* * * * *